United States Patent

[11] 3,622,018

| [72] | Inventor | John M. Morris |
| | | Louisville, Ky. |
| [21] | Appl. No. | 872,227 |
| [22] | Filed | Oct. 29, 1969 |
| [45] | Patented | Nov. 23, 1971 |
| [73] | Assignee | Rex Chainbelt Inc. |
| | | Milwaukee, Wis. |

[54] APPARATUS FOR PROVIDING MASS FLOW OF STORED MATERIAL
8 Claims, 3 Drawing Figs.

[52] U.S. Cl. ...................................... 214/10, 198/60, 214/17 R, 222/200
[51] Int. Cl. ...................................... B65g 3/12
[50] Field of Search .......................... 214/17 R, 17 D, 10; 198/59, 60; 222/161, 199, 200

[56]       References Cited
           UNITED STATES PATENTS
833,761    10/1906   Stevens .................   214/17
3,257,040  6/1966   Dumbaugh et al ............   222/161
3,318,436  5/1967   Ray .............................   198/60

Primary Examiner—Robert G. Sheridan
Attorney—Marshall & Yeasting

ABSTRACT: The apparatus is a live bottom for a stockpile, comprising an aligned series of hoppers which are rectangular in plan and are open at the top to receive the base of a stockpile. Each of the aligned hoppers has a bottom discharge opening in the form of a slot extending substantially continuously across the hopper, and has a bottom portion that extends substantially throughout the length of the slot, along at least one side of tee slot, and slopes downward toward the slot. Mechanism is provided for vibrating the hopper to cause material to flow across the downward sloping portion of the hopper into the slot. A conveyor extends below the slot throughout the length of the slot, for receiving material discharged through the slot.

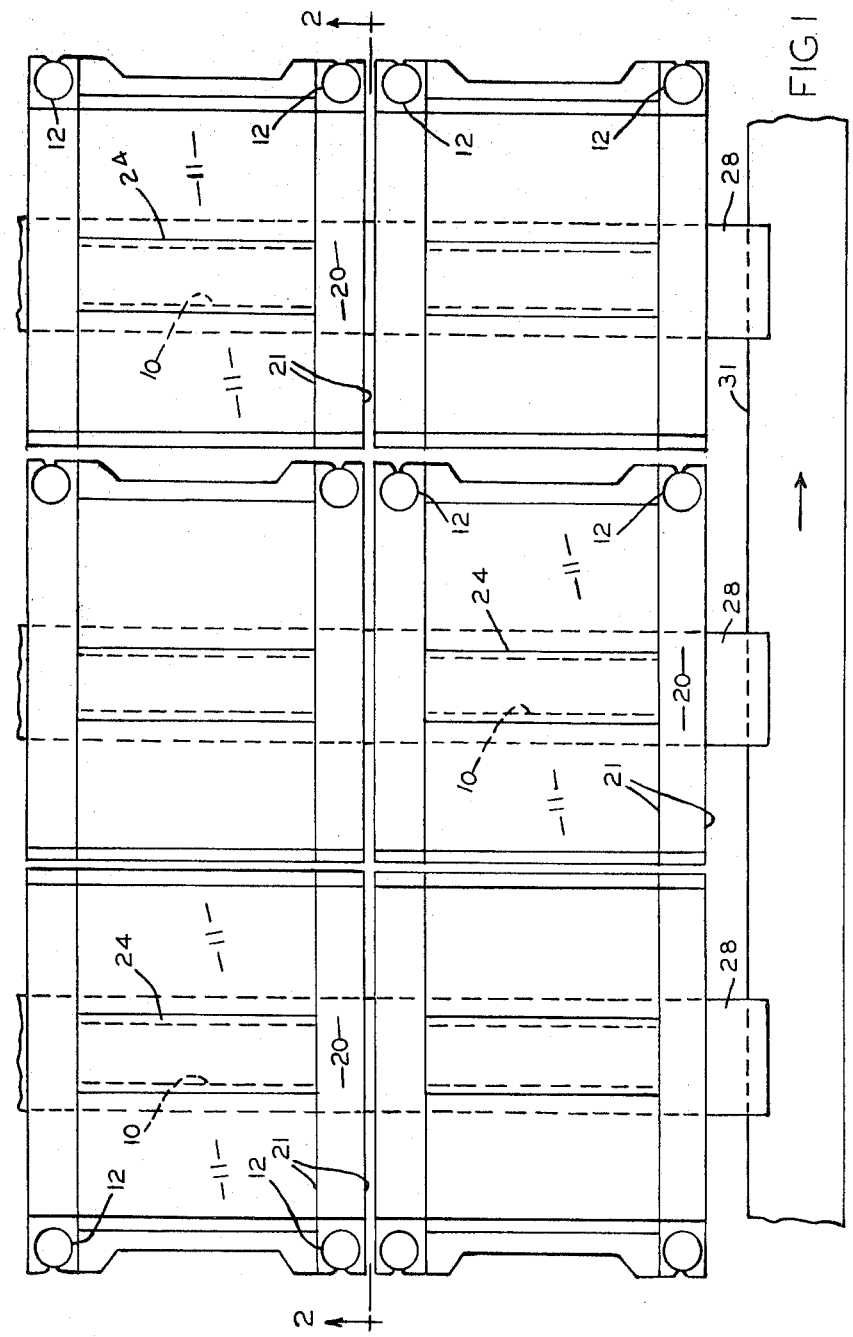

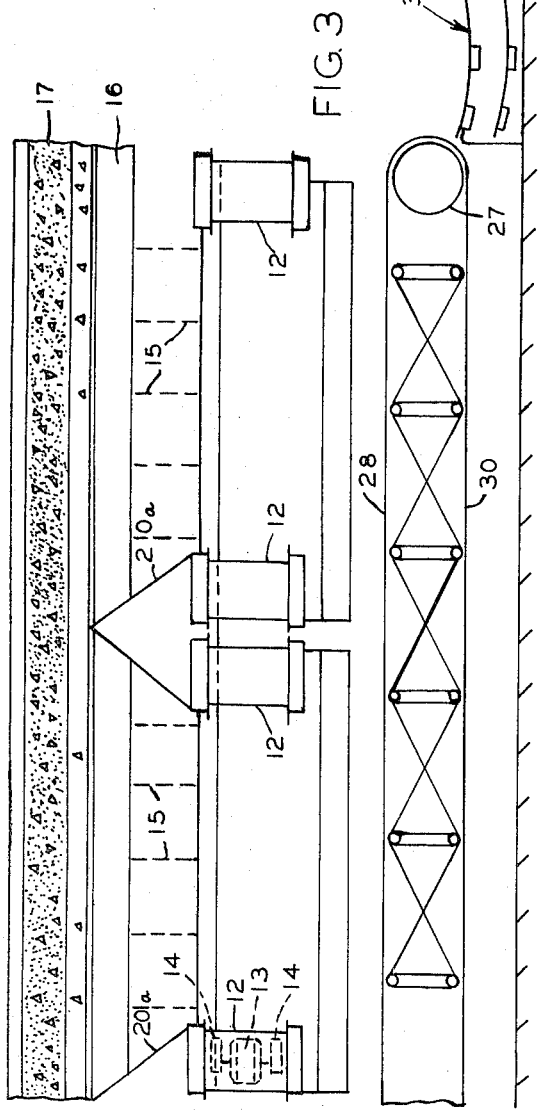
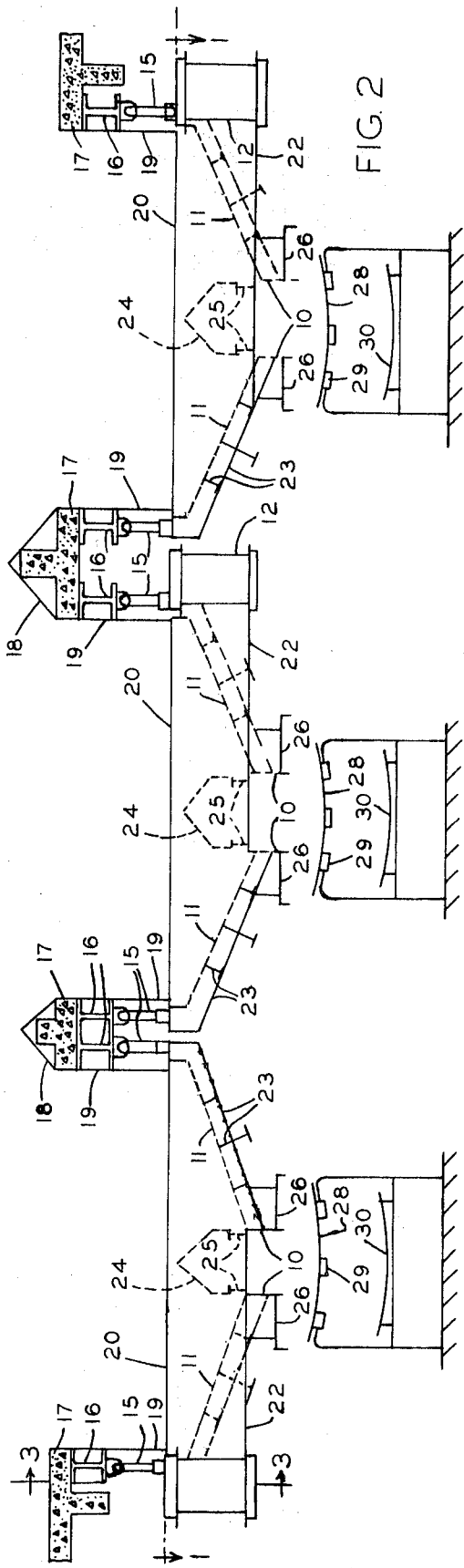

APPARATUS FOR PROVIDING MASS FLOW OF STORED MATERIAL

BACKGROUND OF THE INVENTION

There are many solid materials, such as sawdust, wood chips, coal and ores, which are handled in large quantities in industrial operations. Such materials are stored in stockpiles or large bins, and it is desirable to provide conveying apparatus which is capable of delivering a large quantity of such material from storage in a relatively short time.

A belt conveyor is useful for delivering large quantities of solid material, because it can be operated at a high speed and can be used to convey the material over relatively long distances.

One of the fundamental characteristics of a belt conveyor is that it carries a relatively small stream of material at a relatively high speed. The control of the flow of a small, high speed stream of material to a belt conveyor from a large bin or stockpile of stored material is a difficult engineering problem.

Because of the fact that new material is added at the top of a large bin or stockpile, removal of material must take place at the bottom in order to provide proper flowH-through of the material and to eliminate pockets in which material remains indefinitely in dead storage.

Thus the engineering problem in question is the problem of controlling and maintaining the flow of a relatively small, rapidly flowing stream of solid material from the bottom of a large bin or stockpile to supply a belt conveyor or other material receiver.

In order to make it possible to deliver a stream of solid material from a large bin, a hopper having a downwardly converging bottom portion leading to a discharge opening of moderate size is commonly provided at the bottom of the bin. However, the material may flow through the discharge opening of such a hopper quite slowly and with considerable difficulty, because the material on the converging bottom portion adjacent to the discharge opening is under great pressure from the weight of the material above, and therefore tends to form a bridge or arch above the discharge opening. Even when the hopper is structurally separate from the overlying bin and is mechanically vibrated, the flow of the material through the discharge opening of the hopper tends to be irregular, and to be arrested from time to time by the formation of a bridge or arch in the material immediately above the discharge opening.

The structures heretofore used for assisting the discharge of material from the bottom of a large bin have been relatively expensive, because it has been necessary to use a hopper of relatively great height and a heavy vibratory apparatus to expedite the flow of the material.

SUMMARY OF THE INVENTION

The principal object of the invention is to provide relatively inexpensive, lightweight apparatus for withdrawing a rapidly flowing uniform stream of solid material from the bottom of a large bin or stockpile. The present apparatus is particularly useful for recovering from the bottom of a large stockpile, and may be used to withdraw material selectively from any part of the stockpile, or simultaneously from all parts of the stockpile. The fundamental unit of the present apparatus is a hopper which has a bottom discharge opening in the form of a slot extending substantially continuously across the hopper. The hopper also has at least one generally flat or arcuate bottom portion extending substantially throughout the length of the slot, along one side of the slot, and sloping downward toward the slot. Mechanism is provided for vibrating the hopper to cause material to flow along the generally flat or arcuate bottom portion of the hopper into the slot. The hopper preferably is vibrated by such mechanism along a path having a component transverse to the slot. In the most desirable embodiment, the vibratory movement of any given point on the hopper takes place substantially in a plane perpendicular to the slot. In such an embodiment the vibration of the hopper may consist of oscillation of the hopper about an axis parallel to the slot, but preferably consists of horizontal vibratory movement transverse to the slot.

The present apparatus also includes a conveyor or other material receiver extending below the slot and along the length of the slot, for receiving material discharged through the slot.

The vibration of the present hopper causes material to flow downward along the sloping bottom portion of the hopper which extends substantially throughout the length of the slot. Since the slot extends substantially continuously across the hopper, and since the sloping bottom portion of the hopper extends substantially throughout the length of the slot, a substantial flow of material from the hopper occurs throughout the length of the slot and falls upon the conveyor or other material receiver which extends below the slot. In this way, a rapidly flowing uniform stream of material is withdrawn from the bottom of the bin or stockpile.

BRIEF DESCRIPTION OF THE DRAWINGS

FIG. 1 is a fragmentary plan view of an apparatus embodying the invention.

FIG. 2 is a diagrammatic vertical section of a structure for supporting a stockpile, which includes the apparatus shown in FIG. 1.

FIG. 3 is a diagrammatic vertical section on the line 3–3 of FIG. 2.

DESCRIPTION OF THE PREFERRED EMBODIMENTS

The embodiment of the invention which is shown in the drawings is an apparatus for recovering material from the bottom of a stockpile. The apparatus comprises a large number of similar units, six of which, located at one end of the stockpile are shown in the drawings. These units may be described as dynamic discharges or unloaders. Each of the units is in the form of a shallow hopper that occupies a minimum amount of vertical space.

Each of the six hoppers shown in the drawings has a bottom discharge opening in the form of a slot 10 extending substantially continuously across the hopper. Although the discharge slot may be located adjacent to one side of the hopper, it preferably is located centrally of the hopper as shown in the drawings. For most efficient discharge of the material, each hopper has two generally flat portions 11 extending substantially throughout the length of the slot 10, along the two sides of the slot, and sloping downward toward the slot.

Each of the hoppers is provided with mechanism for vibrating the hopper in order to cause material to flow along the generally flat portions 11 toward the slot 10. The direction of the vibration preferably is such that each point of the hopper vibrates in a plane substantially perpendicular to the slot. It may be noted that vibration parallel to the slot may be used if the slope of the bottom portions 11 is substantial.

Any suitable mechanism may be employed for vibrating the hoppers. Preferably, however, the vibrating mechanism is mounted entirely upon the hoppers, and the hoppers are vibrated as free bodies and are supported in such a manner as to transmit only a minimum amount of vibratory force to the supporting structures.

The mechanism used for vibrating the hoppers preferably consists of units 12, each of which comprises an electric motor 13 the shaft of which is eccentrically loaded as by eccentric weights 14 (FIG. 2). Preferably, two of the units 12, with their motor shafts parallel, and with the centers of gravity of the eccentrically loaded shafts rotating in a common plane, are mounted upon each of the six hoppers. Rotation of the motor shafts then causes each point on the hopper to vibrate in a plane perpendicular to the axes of the motor shafts.

When power is supplied to two motors thus mounted upon one of the hoppers, with their shafts parallel, the inertia forces cause the two motors to lock into synchronism with one another so that the two motors operate at the same speed. The speed of operation of the two motors then may be varied in order to vary the frequency of vibration of the hopper and thus vary the rate at which material is fed through the slot 10.

When two of the units 12 are mounted upon each hopper, with the two motor shafts parallel, the motors always lock in synchronism in such a manner that during oneH-half of each revolution the eccentric weights 14 of each motor shaft are approaching the eccentric weights on the other motor shaft, and during the other half of the revolution the eccentric weights on each motor shaft are receding from the eccentric weights on the other motor shaft. In this manner, the inertia forces created by rotation of the two eccentrically loaded shafts are neutralized except for the forces acting substantially perpendicular to the plane of the motor axes.

If the two motors which are mounted on a hopper are driven in the same direction, the two eccentrically loaded motor shafts lock in synchronism with one another tend to oscillate the hopper about an axis located parallel to and midway between the two motor shafts. If the two motor shafts are thus driven in the same direction, it is desirable to mount the two motors with their shafts horizontal, and to locate the two motors on opposite sides of the discharge slot 10 so that the hopper is oscillated about a central axis in the vicinity of the slot 10.

Preferably, however, the two units 12 are arranged so as to produce horizontal vibratory movement of the hopper transverse to the slot 10. This may be achieved by mounting two of the units 12 upon each hopper, with the two motor shafts lying in a vertical plane substantially parallel to the slot 10, and driving the motor shafts in opposite directions. With this arrangement, two two motor shafts lock into synchronism with one another and cause the hopper to vibrate in a direction perpendicular to the common plane of the motor axes. Such an arrangement is shown in the drawings, in which two of the units 12 are mounted upon one side of each hopper.

In order to mount the hoppers for free horizontal movement under the action of the vibrator units 12, the hoppers are hung by means of links 15. The lower end of the links 15 are pivotally connected to the hoppers, while the upper ends of the links are pivotally connected to I-beams 16 which are secured to supporting concrete beams 17. In order to permit the material in the stockpile to flow freely downward past the concrete beams 17, each intermediate concrete beam is covered with a sloping roof 18 consisting of steel plates. The concrete beams 17 also are provided with depending skirts 19 which keep the material of the stockpile away from the pivoted links 15 and the I-beams 16.

For simplicity of illustration, the plan view, FIG. 1, shows only the hoppers, as indicated by the section line 1—1 in FIG. 2, and does not show the overlying structures.

In order to conduct the vibratory forces to the hoppers, rectangular beams carrying the hopper bottoms 11 extend from the vibratory units 12 across the ends of the hoppers. Each such rectangular beam consists of a top plate 20, side plates 21 and a bottom plate 22.

Stiffening webs 23 are provided on the lower sides of the sloping portions 11 of the hoppers.

In order that the material of the stockpile may flow past the horizontal plates 20 into the hoppers, a deflector roof 20a, made of sheet metal and having two sloping sides, is provided above the plates 20.

In a typical installation the motors 13 may be operated at approximately 875 r.p.m. to vibrate each hopper with a stroke of about three-sixteenths inch. The inclination of the sloping portions 11 of the hoppers may be from about 10° to about 30° to the horizontal, but preferably is about 20°.

Preferably the amplitude and frequency of the horizontal vibration of the hoppers under the influence of the units 12 are such that the maximum acceleration, multiplied by the tangent of the angle of slope of the portions 11, is slightly less than the acceleration of gravity. Because of inertia, the material in the hoppers tends to remain stationary as the hoppers vibrate. If a particle of material resting upon one of the sloping surfaces 11 did not participate in the horizontal vibration, it would tend to fall under the influence of gravity as the sloping surface 11 moves outward away from the slot, and would be wedged upward as the sloping surface 11 moves inward toward the slot. When the amplitude and frequency of vibration are of sufficient magnitude the pressure against each sloping surface 11 produced by the weight of the material tends to approach zero as the surface 11 moves outward. Then as the sloping surface 11 begins to move inward during the return stroke, the pressure of the material upon the surface 11 becomes almost twice the pressure which is produced by the weight of the material when the hopper is stationary.

The extremely low pressure which the material exerts on the sloping surface 11 as the sloping surface begins its outward stroke permits the surface 11 to slip outward past the material. On the other hand, the high pressure exerted by the sloping surface 11 upon the material as the surface 11 begins its inward stroke causes the material to be moved inward. The overall effect of the vibration is that the material resting upon the sloping surfaces 11 is kept in motion and is constantly sliding down the sloping surfaces toward the slot 10.

In order to prevent uncontrolled feeding of freely flowing material, each hopper preferably includes a roof or baffle overlying the slot and extending along the slot. Preferably each such baffle 24, in transverse section, is in the shape of an inverted V as shown in FIG. 2. The material extending immediately above the lot 10 flows down the sloping surfaces of the baffle 24 in the same way that the material above the sloping surfaces 11 flows down those surfaces. Thus the action of the baffle 24 is to control the flow of the material lying above the slot 10, and to prevent that material from interfering with the flow of the material which enters the slot 10 from the sides.

Vertical plates 25, attached along the lower edges of the baffles 24, are arranged at the proper height to provide a vertical gap of the desired width to regulate the rate of flow of the material into the slot 10. At the bottom of each slot 10 are provided a pair of adjustable horizontal plates 26, which may be moved inward toward one another in order to restrict or cut off the flow of material through the slot 10.

The apparatus shown in FIG. 1 includes three series of hoppers, the slots 10 of the hoppers in each series being in substantial alignment. FIG. 1 shows only the last two hoppers in each series, the remaining hoppers being omitted from the drawings for the sake of simplicity. As shown in FIG. 1, each of the hoppers is rectangular in plan, and the hoppers are closely juxtaposed in order to form a base for a stockpile.

Each of the three series of hoppers shown in FIG. 1 is provided with a common conveyor, preferably a belt conveyor driven by a pulley 27 (Fig. 3). Each of the three belt conveyors may include an upper run 28 carried on rollers 29, and a lower run 30. Each of the three belt conveyors receives material discharged through the aligned slots 10 of one series of hoppers.

The three belt conveyors discharge material onto a collecting belt conveyor 31.

In the apparatus shown in the drawings, with all of the conveyor belts operating, several of the hoppers may be vibrated simultaneously so as to keep the collecting belt conveyor 31 filled to capacity. The belt conveyor 31 may be a large belt conveyor traveling at a high speed.

The present apparatus provides complete flexibility in discharging material from a stockpile. The stockpiled material, such as coal or wood chips, may be withdrawn from all the hoppers simultaneously by vibrating all the hoppers, or may be withdrawn from various parts of the stockpile sequentially by vibrating selected hoppers. Also, material from several parts of the stockpile may be blended by vibrating selected hoppers simultaneously.

I claim:

1. A live bottom for a stockpile, comprising an aligned series of hoppers which are rectangular in plan and are open at the top to receive the base of a stockpile, and which have aligned discharge openings consisting of a slot in the bottom of each hopper extending substantially continuously across the hopper, each hopper having a bottom portion that extends substantially throughout the length of the slot, along at least one side of the slot, and slopes downward toward the slot, and mechanism for vibrating each hopper to cause material to flow across the downward sloping portion of the hopper into the slot.

2. Apparatus according to claim 1, wherein each hopper has two generally flat portions extending substantially throughout the length of the slot, along the two sides of the slot, and sloping downward toward the slot.

3. Apparatus according to claim 2 wherein each hopper has a baffle extending upward from the slot and generally parallel to the slot.

4. Apparatus according to claim 3 wherein the baffle, in transverse section, is in the shape of an inverted V.

5. Apparatus according to claim 1 wherein each hopper is mounted for horizontal vibratory movement transverse to the slot.

6. Apparatus according to claim 5 wherein the mechanism for vibrating each hopper comprises a pair of eccentrically loaded parallel shafts, rotating in opposite directions, the axes of which lie in a plane which is generally vertical and parallel to the slot.

7. Apparatus according to claim 1 comprising a common belt conveyor extending below the slots, for receiving material discharged through all of the slots.

8. Apparatus according to claim 7 comprising a plurality of series of similar hoppers, the bottom discharge slots of each series of hoppers being substantially aligned and parallel to the slots of each other series, and each series of hoppers having a common belt conveyor extending below the slots; and a collecting belt conveyor arranged to receive material from the ends of the other belt conveyors; the hoppers being closely juxtaposed to form the base of a stockpile.

* * * * *